March 4, 1969   P. J. CASSIDY ET AL   3,431,043
BINOCULAR INTERPUPILLARY HINGE ASSEMBLY
WITH FRICTIONAL O-RINGS
Filed Nov. 24, 1965

INVENTORS:
PATRICK J. CASSIDY
MILTON L. QUAMMEN

BY: Harry M. Saragovitz
Edward J. Kelly, Herbert Berl
& S. Dubroff
ATTORNEYS

United States Patent Office

3,431,043
Patented Mar. 4, 1969

3,431,043
BINOCULAR INTERPUPILLARY HINGE ASSEMBLY WITH FRICTIONAL O-RINGS
Patrick J. Cassidy and Milton L. Quammen, Philadelphia, Pa., assignors to the United States of America as represented by the Secretary of the Army
Filed Nov. 24, 1965, Ser. No. 510,147
U.S. Cl. 350—75    7 Claims
Int. Cl. G02b 7/12, 7/00; E05d 11/08

ABSTRACT OF THE DISCLOSURE

A frictional hinge device for connecting two halves of a binocular and holding them at a proper interpupillary setting. The hinge device includes a sleeve secured to one half of the binocular and a friction shaft secured to the other half and having grooves therein for receiving resilient O-rings whereby insertion of the shaft into the sleeve creates friction engagement between the binocular halves.

---

The invention described herein may be manufactured and used by or for the Government for governmental purposes without the payment to us of any royalty thereon.

The present invention relates to a binocular instrument having rotatable elements on a common axis for interpupillary adjustment and more particularly a binocular instrument incorporating therewithin a friction device for holding the interpupillary distance.

The art is well supplied with devices for holding two halves of a binocular at the proper interpupillary setting. The most common of these devices consists of a tapered axle pinned to one half and a bushing with a tapered hole matching the axle pinned to the other half. These mating components are drawn together by screws; friction between the tapered surfaces provides the restraining force to hold the binocular halves in proper relation to each other. However, to keep the hinge movement firm and smooth throughout the range of the interpupillary scale requires such maintenance and time-consuming operations as trial-and-error shimming, reaming of bushings and the drilling of new holes for pins. The desirability of a means for providing the holding friction in a binocular which is not so subject to wear and which is easier to assemble and to maintain has been recognized by maintenance personnel of the optical industry for many years.

It is therefore an object of this invention to provide an interpupillary hinge assembly that does not require a precision fitting operation.

Another object is the provision of an interpupillary hinge assembly that is moisture proof.

Still another object of this invetion is to provide an interpupillary hinge assembly utilizing less precision parts than were previously necessary.

A still further object of this invention is to provide an interpupillary hinge assembly which has increased strength over previous assemblies.

The above objects as well as others together with the benefits and advantages of the invention will be apparent upon reference to the detailed description set forth below, particularly when taken in conjunction with the drawing annexed hereto in which.

Figure 1:
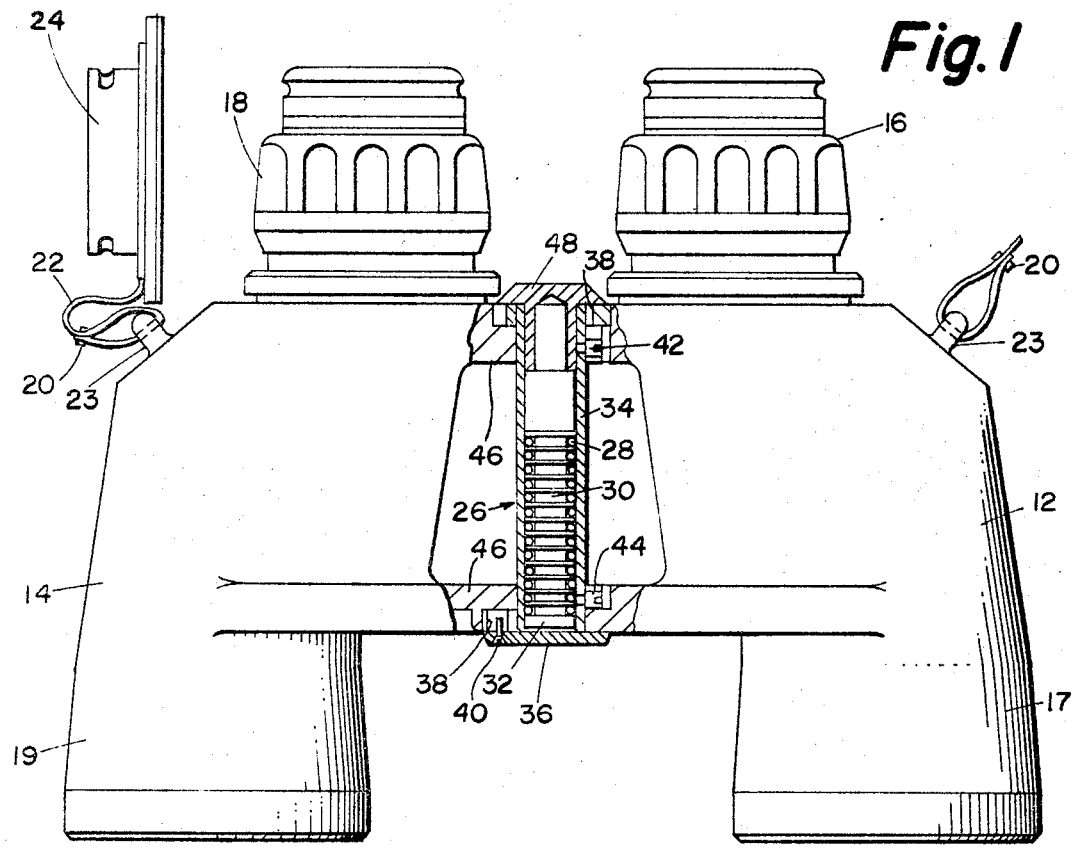
FIG. 1 shows, in phantom, a top view, partly in section of an embodiment of the present invention.
Figure 2:
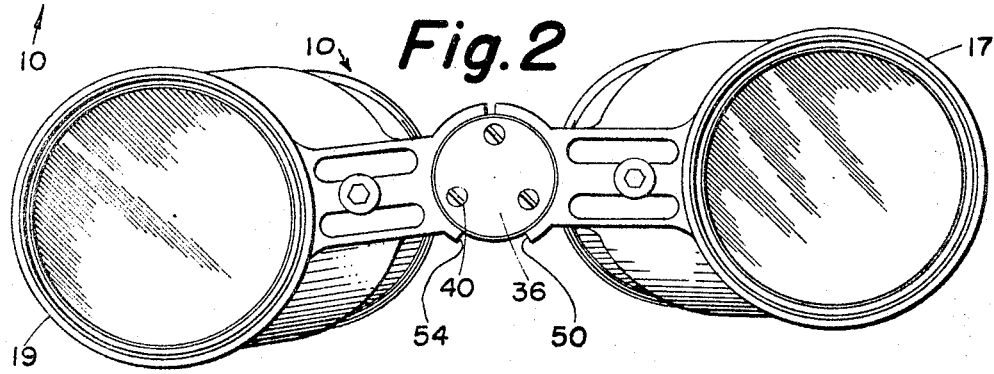
FIG. 2 shows a view as seen from the objective end of invention.
Figure 3:
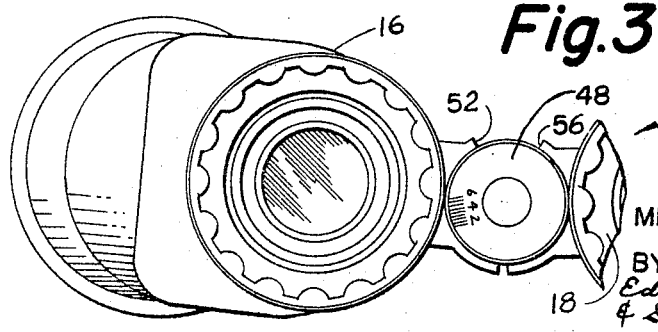
FIG. 3 shows a view as seen from the eye piece end of the invention.

The binocular, indicated generally by the reference character 10, comprises a left hand housing assembly 12 and a right hand housing assembly 14. Attached to the left hand housing assembly 12, is an eye piece assembly 16 and an objective assembly 17, and attached to the right hand housing assembly 14, is an eye piece assembly 18, and an objective assembly 19, secured thereto in a known manner.

Attached to the binocular 10 by halter bolts 20 is a neckcord 22 which passes through lugs 23 and which has a filter adapter 24 secured thereto.

Movably securing the two housing assemblies 12 and 14 together is a hinge pin assembly, indicated generally by the reference character 26. Friction is created by a series of rubber, doughnut shaped O-rings 28, located in grooves 30 of a friction shaft 32, said friction shaft being inserted into a sleeve 34. The outside diameter of the O-rings 28 is slightly greater than the inside diameter of sleeve 34 whereupon insertion of friction shaft 32 into sleeve 34 compresses said O-rings thereby causing frictional engagement between said shaft and sleeve. The flange 36 of the friction shaft 32 is attached to one of bearing ears 38 of the left hand housing assembly 12 by screws 40. The sleeve 34 is keyed to the right hand assembly 14 by a dog point screw 42. A set screw 44 in one of the opposite bearing ears 46 of the right hand housing assembly 14 removes any play therefrom. The interpupillary scale 48 is inserted into the end of the sleeve 34, adjusted to the proper setting and locked in place with the end of the dog point screw 42.

Fixed stops 50 and 52 on the left hand housing and 54 and 56 on the right hand housing limit the motion of the interpupillary adjustment.

Obviously many modifications and variations of the present invention are possible in the light of the above teachings. It is therefore to be understood, that within the scope of the appended claims, the invention may be practiced otherwise than as specifically described.

We claim:
1. A binocular including right and left hand housing assemblies, each of said right and left hand housing assemblies containing an eye piece assembly, an objective assembly, a pair of bearing ears, and an interpupillary hinge pin assembly passing through said bearing ears, said interpupillary hinge pin assembly comprising a sleeve, a friction shaft inserted into said sleeve, grooves in said friction shaft, said grooves containing O-rings therein, said O-rings [being so constructed and arranged] having an outside diameter greater than the inside diameter of said sleeve so that friction between the sleeve and the shaft is accomplished.

2. A binocular of the type described in claim 1 wherein said O-rings are of the rubber, doughnut shaped type.

3. A binocular of the type described in claim 1 wherein said bearing ears have means for the securing thereto of said interpupillary hinge pin assembly.

4. A binocular of the type described in claim 1 including a dog point screw keying said sleeve to one of said right hand bearing ears.

5. A binocular of the type described in claim 1 wherein in said friction shaft has a flange at one end thereof, said flange being secured to one of said left hand bearing ears.

6. A binocular of the type described in claim 5 wherein said flange is secured to one of said left hand bearing ears by a plurality of screws.

7. A binocular of the type described in claim 1 including an interpupillary scale inserted into the opposite end of said sleeve and locked into place with said dog point screw.

References Cited

UNITED STATES PATENTS

| 916,528 | 3/1909 | Broome | 350—75 |
| 2,393,339 | 1/1946 | Russell | 350—75 |
| 3,058,391 | 10/1962 | Leupold | 350—44 |

FOREIGN PATENTS 665,542  5/1929  France.

DAVID SCHONBERG, Primary Examiner.

T. H. KUSMER, Assistant Examiner.

U.S. Cl. X.R.

16—140; 350—67